United States Patent Office 3,179,690
Patented Apr. 20, 1965

3,179,690
PROCESS FOR MAKING DIALKYL ALKYL
PHOSPHONATES
John A. Kearney, Tonawanda, and Charles J. Smith, Jr.,
Grand Island, N.Y., assignors to Olin Mathieson Chemical Corporation, a corporation of Virginia
No Drawing. Filed Mar. 31, 1954, Ser. No. 420,211
4 Claims. (Cl. 260—461)

Our invention relates to a method for the preparation of phosphonates of the formula (RO)(R'O)P(O)R'' in which R, R' and R'' are alkyl radicals.

Copending application Serial No. 335,174, filed February 4, 1953, now abandoned, of Charles J. Smith, Jr., described an improved method for the preparation of compounds falling within the generic formula (RO)(R'O)P(O)(R'')

by reacting a compound of the formula (RO)(R'O)P(O)H with an alkali metal, R, R' and R'' being alkyl radicals. In accordance with the method described in the Smith application, the reaction is carried out by first dispersing an alkali metal in a petroleum distillate having an initial boiling point within the range from about 450 to about 550° F. to form an alkali metal salt of the formula (RO)(R'O)P(O)M where M is an alkali metal. The alkali metal salt thus formed, while dissolved in the petroleum distillate, is then reacted with an organic halide of the formula R''X, X representing halogen, to form a solution of a compound of the formula (RO)(R'O)P(O)(R'')

in the petroleum distillate and precipitating a salt of the alkali metal and X. This salt is then separated from the reaction mixture and thereafter the reaction mixture is subjected to a vacuum distillation operation to remove the compound of the formula (RO)(R'O)P(O)(R'') as overhead and the petroleum distillate as bottoms. The alkali metal used can be either sodium or potassium, and X can be either chlorine or bromine. Preferably the reaction is carried out at a temperature within the range from about 70 to about 110° C. and preferably the petroleum distillate used is a straight run one and has a boiling range of about 500 to 600° F.

Although the process described in the aforementioned Smith application possesses definite merit when compared with prior art processes, for reasons set forth in that application, operation of the procedure of the Smith application is not completely satisfactory. Thus, it has been noted that when the alkali metal halide formed during the process has been separated from the reaction mixture and the reaction mixture is thereafter vacuum distilled, gel-like or gelatinous solids, apparently alkali metal salts of phosphorus esters, appear in the still bottoms after the distillation of the desired product overhead has been completed. These solids interfere with the distillation operation, particularly when it is desired to operate continuously with a given piece of distillation equipment.

In accordance with our present invention, we have discovered, however, that the formation of the gel-like solids in the still during the vacuum distillation operation can be either largely or completely eliminated if the distillation is performed while the reaction mixture has in admixture with it a small amount of a high boiling oxygenated aliphatic solvent, particularly diethylene glycol. The effect of the use of the solvent is to keep the side products, which otherwise form the gel, in solution in the solvent, which is essentially insoluble in the petroleum distillate used. During the distillation, the oxygenated solvent and side products in solution therein settle in a separate layer which can be conveniently removed from the distillation vessel.

The following example illustrates in detail an embodiment falling within the scope of our invention. In the example, the parts and percentages are by weight, unless otherwise specified.

*Example*

265 parts of a 15 percent by weight dispersion of metallic sodium in a straight run petroleum distillate boiling within the range 500 to 600° F. and maintained at about 110° C. is added to a solution composed of 256 parts of di-isopropyl hydrogen phosphite in 970 parts of the petroleum distillate which has been preheated to about 65° C., the rate of addition of the dispersion being such that the temperature of the reaction mixture is held at about 90° C. The reaction mixture is then cooled to 85° C. and 127 parts of gaseous methyl chloride is bubbled in over a period of 25 minutes while the reaction temperature is maintained within the range 75–90° C. Sodium chloride in very finely divided form precipitates as the reaction proceeds. The reaction mixture is then cooled to room temperature and the sodium chloride is separated by filtration. A portion of filtrate is then admixed with about 3 percent by weight of diethylene glycol and is then introduced into a vacuum distilling column operated at an absolute pressure of 5 mm. of mercury. When the vacuum distilling column is so operated, the desired product in substantially pure form is taken off as overhead when the vapor temperature is about 70° C. and the distillation pot attached to the bottom of the distilling column remains substantially free from precipitated gel-like solids.

As those skilled will anticipate, various modifications can be made in the procedure of the example just given in order to provide other embodiments which fall within the scope of our invention. Being an improvement over the procedure described in the Smith application referred to above, our invention is not restricted to processes resulting in the formation of diisopropyl methane phosphonate, but is generally applicable to the preparation of compounds of the formula (RO)(R'O)P(O)(R'') wherein R, R' and R'' are alkyl radicals. Preferably, however, the sum of the carbon atoms in R and R' should not exceed 8, that is, the sum obtained by adding the number of carbon atoms in R to the number of carbon atoms in R' should not exceed 8, and likewise the number of carbon atoms in R'' should not exceed 4. Also, as the Smith application teaches, other petroleum distillates can be used in place of the particular one employed in the specific example. Thus, there can be used mineral seal oil, a distillate of 36–39° A.P.I. gravity, 250–260° F. minimum flash point, 480–540° F. initial boiling point and 600–700° F. end point. Alternatively, there can be used an absorption oil boiling within the range 482–630° F. and having a 37° A.P.I. gravity or straight-run gas oil boiling within the range 440–800° F. and having a 30° A.P.I. gravity.

In the specific illustration, diethylene glycol was employed for the purpose of preventing the formation of gel-like solids. In its place, however, there can be substituted other high boiling oxygenated aliphatic solvents, for example, triethylene glycol; lower monoalkyl ethers of diethylene glycol and lower dialkyl ethers of diethylene glycol; such as the monomethyl ether of diethylene glycol, the dimethyl ether of diethylene glycol, the monobutyl ether of diethylene glycol, the dibutyl ether of diethylene glycol, and the like. The amount of oxygenated solvent employed is not critical and can be varied somewhat in order to produce the desired effect. Generally, however, the amount of oxygenated solvent used is within the range from about 2 percent to about 10 percent by weight, based upon the weight of the mixture subjected to the vacuum distillation. Likewise, the degree of vacuum employed is not critical, absolute pressures within the range from about 5 to about 50 mm. of mercury being preferred.

We claim:
1. In the recovery of an alkyl phosphonate of the formula (RO)(R'O)P(O)(R'') from a reaction mixture obtained by reacting a compound of the formula

$$(RO)(R'O)P(O)H$$

with an alkali metal while the alkali metal is dispersed in a petroleum distillate to form an alkali metal salt of the compound for the formula (RO)(R'O)P(O)H, reacting the alkali metal salt while dissolved in the petroleum distillate with a compound of the formula R''X to form a solution of the compound of the formula (RO)(R'O)P(O)(R'') in the petroleum distillate and precipitating a salt of the alkali metal and X, separating the salt of the alkali metal and X from said mixture and subjecting said mixture to vacuum distillation, the step of subjecting said mixture to vacuum distillation while said mixture is in admixture with a high boiling oxygenated aliphatic solvent selected from the group consisting of diethylene glycol, triethylene glycol, lower monoalkyl ethers of diethylene glycol and lower dialkyl ethers of diethylene glycol in amount sufficient substantially to prevent the formaton of gel-like solids during the distillation and removing a compound of the formula $$(RO)(R'O)P(O)(R'')$$

as overhead and the petroleum distillate and said oxygenated aliphatic solvent as bottoms, R, R' and R'' being alkyl radicals, the sum of the carbon atoms in R and R' not exceeding 8 and the number of carbon atoms in R'' not exceeding 4, the alkali metal being selected from the group consisting of sodium and potassium, the petroleum distillate being one having an initial boiling point within the range from about 450 to about 550° F., and X being selected from the group consisting of chlorine and bromine.

2. A method according to claim 1 in which said oxygenated aliphatic solvent is diethylene glycol.
3. A method according to claim 1 in which R and R' are the isopropyl radical, in which R'' is the methyl radical, in which X is chlorine and in which the alkali metal is sodium.
4. A method according to claim 3 in which said oxygenated aliphatic solvent is diethylene glycol.

References Cited by the Examiner

Kosolapoff: J.A.C.S., vol. 73, Issue No. 8, August 1951, page 4040.

Kosolapoff: "Organo-Phosphorus Compounds," by John Wiley & Sons, Inc., N.Y., pub. 1950, pages 5, 121–124 and 195–198.

CHARLES B. PARKER, *Primary Examiner.*

WILLIAM G. WILES, *Examiner.*